US006968679B2

(12) United States Patent
Pott

(10) Patent No.: US 6,968,679 B2
(45) Date of Patent: Nov. 29, 2005

(54) METHOD FOR OPERATING AN INTERNAL COMBUSTION ENGINE

(75) Inventor: Ekkehard Pott, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/659,676

(22) Filed: Sep. 10, 2003

(65) Prior Publication Data

US 2004/0045278 A1   Mar. 11, 2004

Related U.S. Application Data

(63) Continuation of application No. PCT/EP02/01164, filed on Feb. 5, 2002.

(30) Foreign Application Priority Data

Mar. 10, 2001  (DE) ................................ 101 11 586

(51) Int. Cl.[7] .............................................. F01N 3/00
(52) U.S. Cl. ........................... 60/285; 60/274; 60/276; 60/288; 204/424; 204/427; 73/23.31; 73/118.1
(58) Field of Search .......................... 60/274, 276, 285, 60/286, 288; 73/118.1, 23.31, 23.32; 204/421, 204/424, 425, 426, 427

(56) References Cited

U.S. PATENT DOCUMENTS

| 5,307,625 | A |   | 5/1994  | Junginger et al. |
| 5,329,764 | A |   | 7/1994  | Hamburg et al. |
| 5,426,934 | A |   | 6/1995  | Hunt et al. |
| 5,452,576 | A |   | 9/1995  | Hamburg et al. |
| 6,000,218 | A |   | 12/1999 | Hafele |
| 6,092,367 | A | * | 7/2000  | Dölling ........................ 60/274 |
| 6,174,421 | B1 |   | 1/2001  | Schumann |
| 6,301,878 | B1 | * | 10/2001 | Zhang et al. .................. 60/274 |
| 6,355,151 | B1 | * | 3/2002  | Brosda et al. ............... 204/424 |
| 6,378,295 | B1 | * | 4/2002  | Heinze ........................ 60/274 |
| 6,427,439 | B1 | * | 8/2002  | Xu et al. ...................... 60/286 |
| 6,546,720 | B2 | * | 4/2003  | van Nieuwstadt ............ 60/286 |
| 6,592,732 | B1 | * | 7/2003  | Komachiya et al. ......... 204/426 |

FOREIGN PATENT DOCUMENTS

| DE | 41 25 154 A1 | 2/1993 |
| DE | 42 07 506 A1 | 9/1993 |
| DE | 44 02 850 A1 | 8/1994 |
| DE | 44 41 432 A1 | 5/1996 |
| DE | 195 11 548 A1 | 6/1996 |
| DE | 198 52 244 C1 | 12/1999 |
| DE | 198 31 424 A1 | 2/2000 |
| DE | 199 36 355 A1 | 2/2001 |
| DE | 100 10 041 A1 | 9/2001 |

(Continued)

Primary Examiner—Tu M. Nguyen
(74) Attorney, Agent, or Firm—Laurence A. Greenberg; Werner H. Stemer; Manfred Beck

(57) ABSTRACT

A method for operating an internal combustion engine includes the step of measuring emission values of at least two pollutant components of an exhaust gas of an internal combustion engine. A value of at least one operating parameter of the internal combustion engine is changed in order to decrease an emission value of a first pollutant component if the emission value of the first pollutant component exceeds a given maximum threshold value. An emission value of a second pollutant component is monitored in order to determine whether the emission value of the second pollutant component remains below a maximum value for the second pollutant component and whether an increase in the emission value to the maximum value for the second pollutant component is permitted.

39 Claims, 4 Drawing Sheets

FOREIGN PATENT DOCUMENTS

| | | |
|---|---|---|
| EP | 0 090 941 A2 | 10/1983 |
| EP | 0 816 820 A2 | 1/1998 |
| EP | 0 899 563 A1 | 3/1999 |
| JP | 01110851 A | 4/1989 |
| WO | 90/02874 | 3/1990 |
| WO | 97/47962 | 12/1997 |

* cited by examiner

METHOD FOR OPERATING AN INTERNAL COMBUSTION ENGINE

CROSS-REFERENCE TO RELATED APPLICATION

This application is a continuation of copending International Application No. PCT/EP02/01164, filed Feb. 5, 2002, which designated the United States and was not published in English.

BACKGROUND OF THE INVENTION

FIELD OF THE INVENTION

The invention relates to a method for operating an internal combustion engine wherein at least one operating parameter of the internal combustion engine is changed as a function of emission values of an exhaust gas. The invention further relates to a method for operating an internal combustion engine wherein a pollutant emission of the internal combustion engine is used to diagnose an operating state of the internal combustion engine. The invention further relates to a method for operating an internal combustion engine wherein at least one lambda probe, which is disposed in an exhaust gas system of the internal combustion engine, continuously regulates the lambda value of the exhaust gas.

In order to optimize the emission and consumption behavior of internal combustion engines it is known to determine the pollutant emission values of the exhaust gas and to change the operating parameters of the internal combustion engine as a function of the determined emission values in order to decrease the emission values. In this respect it is customary to provide sensors in the exhaust gas system of the internal combustion engine, the signals of these sensors are fed to an engine controller which influences operating parameters, for example the quantity of air that is taken in, the ignition time, if appropriate an exhaust gas recirculation rate or the like, as a function of the signals of the sensors. As the internal combustion engines which are customary today require exhaust gas post-treatment through the use of catalytic converter devices owing to the relatively high raw emissions of pollutants, the aforementioned sensors are arranged downstream and/or upstream of the catalytic converter devices in the exhaust gas system. In this context, to sense the pollutant emissions in a differentiated way it is also known to determine the emission values of various pollutant components separately. In this context, an engine control system for optimizing the conversion efficiency of a catalytic converter device which is arranged in the exhaust gas system of an internal combustion engine and has a nitrogen oxide ($NO_x$) sensor and a carbon monoxide (CO) sensor and hydrocarbon (HC) sensor is known from U.S. Pat. No. 5,329,764. Both sensors are arranged downstream of the catalytic converter device. A difference signal, which is fed as the feedback variable to a fuel regulating device in order to set a desired fuel/air ratio is formed from the signals of the two sensors. The difference signal is used here as a correction signal for setting the lambda value of the exhaust gas in order to achieve a maximum conversion efficiency of the catalytic converter device. However, the optimization of the emission behavior which is to be achieved with this known system is restricted to a range about a stoichiometric air/fuel ratio, only an imprecise correction being also possible here owing to the influence of other variables such as leaks in the exhaust gas system.

Published, Non-Prosecuted German Patent Application DE 195 11 548 A1 also discloses a method for reducing nitrogen oxide in the exhaust gas of an internal combustion engine in which the content of the exhaust gas in terms of hydrocarbons, carbon monoxide or nitrogen oxide downstream of a nitrogen oxide absorber is measured and in which, in each case the method is switched over from a stoichiometric or enrichment operating phase to a lean operating phase as soon as the content of hydrocarbon or carbon monoxide rises above a predefined amount or as soon as the nitrogen oxide content drops below a predefined amount. The method is switched over from a lean operating phase to a stoichiometric or enrichment operating phase as soon as the measured content of nitrogen oxide rises above a predefined amount.

Published European Patent Documents EP 0899563 and EP 090941, International Publication WO 97/47962, and Published, Non-Prosecuted German Patent Application DE 198 31 424 also disclose sensors for determining the concentration of components of exhaust gases, in particular for determining one or more of the gases $NO_x$, CO, $H_2$ and preferably nonsaturated hydrocarbons. These sensors are used to optimize combustion reactions and to detect component malfunctions.

SUMMARY OF THE INVENTION

It is accordingly an object of the invention to provide a method of operating an internal combustion engine which overcomes the above-mentioned disadvantages of the heretofore-known methods of this general type and which optimizes the operation of an internal combustion engine with respect to the emissions safety and the consumption of fuel.

With the foregoing and other objects in view there is provided, in accordance with the invention, a method for operating an internal combustion engine, the method including the steps of:

measuring emission values of at least two pollutant components of an exhaust gas of an internal combustion engine, the at least two pollutant components including a first pollutant component and a second pollutant component;

changing a value of at least one operating parameter of the internal combustion engine in order to decrease an emission value of the first pollutant component if the emission value of the first pollutant component exceeds a given maximum threshold value; and monitoring an emission value of the second pollutant component in order to determine whether the emission value of the second pollutant component remains below a maximum value for the second pollutant component and whether an increase in the emission value to the maximum value for the second pollutant component is permitted.

In other words, according to the invention, there is provided, a method for operating an internal combustion engine, in particular a spark ignition engine which is capable of lean running or a diesel internal combustion engine, in which at least one operating parameter of the internal combustion engine is changed as a function of emission values of the exhaust gas in order to influence the emission values, wherein the emission values of at least two pollutant components of the exhaust gas such as CO, NO, $NO_2$, $NH_3$, $SO_2$, $H_2S$, $CH_4$ and/or further hydrocarbon components are measured and if the emission value of a first one of the at least two pollutant components exceeds a predefined maximum threshold value, the value of at least one operating parameter, for example a throttle valve position, an exhaust gas recirculation rate, an ignition time, a tumble valve position, an injection time, a charge pressure and/or a phase position of the camshaft or the like is changed in order to decrease the emission value of the first pollutant component, in which case, at least for the second one of the at least two pollutant components, a monitoring of the emission value is provided to determine whether it remains below a maximum value for this pollutant component and whether an increase in the emission value to this maximum value is permitted.

Further, according to the invention, in order to operate an internal combustion engine, for example a spark ignition engine which is capable in particular of lean running or a diesel internal combustion engine, at least one operating parameter of the internal combustion engine is changed as a function of emission values of the exhaust gas in order to influence the emission values. The emission values of at least two pollutant components of the exhaust gas such as $CO$, $NO$, $NO_2$, $NH_3$, $SO_2$, $H_2S$, $CH_4$ and/or further hydrocarbon components are determined and, if the emission value of a first of the at least two pollutant components exceeds a predefined maximum threshold value, the value of at least one operating parameter, for example a throttle valve position, exhaust gas recirculation rate, an ignition time, a tumble valve position, an injection time, a charge pressure and/or a phase position of the camshaft or the like is changed in order to decrease the emission value of the first pollutant component, an increase in the emission value up to a maximum value being permitted at least for the second one of the at least two pollutant components.

With the objects of the invention in view there is also provided, a method for operating an internal combustion engine, the method including the steps of:

determining emission values of at least two pollutant components of an exhaust gas of an internal combustion engine, the at least two pollutant components including a first pollutant component and a second pollutant component; and changing a value of at least one operating parameter of the internal combustion engine if an emission value of the first pollutant component drops below a given minimum threshold value in order to increase the emission value of the first pollutant component to at most the given minimum threshold value in order to decrease at least an emission value of the second pollutant component.

In other words, according to the invention, there is also provided, a method for operating an internal combustion engine, in particular a spark ignition engine which is capable of lean running or a diesel internal combustion engine, in which at least one operating parameter of the internal combustion engine is changed as a function of emission values of the exhaust gas in order to influence the emission values, wherein the emission values of at least two pollutant components of the exhaust gas such as $CO$, $NO$, $NO_2$, $NH_3$, $SO_2$, $H_2S$, $CH_4$ and/or further hydrocarbon components are determined and, if the emission value of a first one of the at least two pollutant components drops below a predefined minimum threshold value, the value of at least one operating parameter, for example a throttle valve position, an exhaust gas recirculation rate, an ignition time, a tumble valve position, an injection time, a charge pressure and/or a phase position of the camshaft or the like is changed in order to increase the emission value of this pollutant component up to a maximum of this threshold value in order to decrease the emission value at least for the second one of the at least two pollutant components.

An advantage of the above-defined methods according to the invention is the adaptation of the raw emission of an internal combustion engine, that is to say the emission upstream of an exhaust gas post-treatment system, to different operating states. In particular, adaptation can be carried out to different requirements in terms of emission limitations. The emission safety of an internal combustion engine which is operated according to the invention is not achieved here, or is not achieved here by a simple lambda control but rather measures which are respectively specifically adapted to the internal combustion engine are used. In particular an adaptation of a throttle valve setting, of an exhaust gas recirculation rate, the selection of an ignition time, of the injection time of pre/main/post injections, of an injection pressure, of the setting of a tumble valve, of a charge pressure and/or the setting of a phase actuator of the camshaft is provided. As a result, an optimized decrease in the pollutant emissions can be achieved in particular also in the warming up phase of an internal combustion engine in which exhaust gas post-treatment measures are provided. In addition, the method according to the invention is suitable in particular for improving the emission safety in lean operating phases in a lean-burn spark ignition engine and in the weak load phases in a diesel engine. According to the invention, in certain circumstances especially a decrease in the concentration of hydrocarbons and the concentration of nitrogen oxide is provided.

A preferred mode according to the invention includes using, as the internal combustion engine, a diesel internal combustion engine or a spark ignition engine configured for a lean running operation.

Another preferred mode according to the invention includes monitoring $CO$, $NO$, $NO_2$, $NH_3$, $SO_2$, $H_2S$, $CH_4$ and a further hydrocarbon component as the first and second pollutant components.

Another preferred mode according to the invention includes using, as the at least one operating parameter of the internal combustion engine, at least one parameter selected from the group consisting of a throttle valve position, an exhaust gas recirculation rate, an ignition time, a tumble valve position, an injection time, a charge pressure and a phase position of a camshaft.

Another preferred mode according to the invention includes measuring values of a raw emission.

Another preferred mode according to the invention includes using hydrocarbon as the first pollutant component and using nitrogen oxide and/or carbon monoxide as the second pollutant component.

Another preferred mode according to the invention includes using nitrogen oxide as the first pollutant component, and using carbon monoxide and/or hydrocarbon as the second pollutant component.

Another preferred mode according to the invention includes using carbon monoxide as the first pollutant component and using nitrogen oxide and/or hydrocarbon as the second pollutant component.

Another preferred mode according to the invention includes choosing at least one pollutant value as a function of an operating point of the internal combustion engine, wherein the at least one pollutant value is the given maximum threshold value of the first pollutant component, a minimum threshold value of the first pollutant component and/or the maximum value of the second pollutant component.

Another preferred mode according to the invention includes choosing at least one pollutant value as a function of an operating point such as a load of the internal combustion engine, a rotational speed of the internal combustion engine and/or an operating temperature of the internal combustion engine, and using, as the at least one pollutant value, the given maximum threshold value of the first pollutant component, a minimum threshold value of the first pollutant component and/or the maximum value of the second pollutant component.

Another preferred mode according to the invention includes providing a catalytic converter device in an exhaust gas system of the internal combustion engine, and choosing the maximum threshold value of the first pollutant component and/or a minimum threshold value of the first pollutant component as a function of an operating point of the catalytic converter device or the internal combustion engine.

Another preferred mode according to the invention includes providing a catalytic converter device in an exhaust gas system of the internal combustion engine, and choosing the maximum threshold value of the first pollutant component and/or a minimum threshold value of the first pollutant component as a function of an operating temperature of the catalytic converter device.

In one preferred embodiment of the invention, hydrocarbon is selected as the first pollutant component to be decreased, and carbon monoxide as the second pollutant component. As a result it is in particular possible to improve the emission safety in the case of a cold start of conventional and lean-burn spark ignition engines. If, as in the further embodiment of the invention, the emissions of nitrogen oxide are decreased at the cost of the emissions of carbon monoxide, it is possible, in particular in a conventional spark ignition engine, for example under full load, to achieve improved emission behavior. Alternatively, in a further embodiment of the invention, the emission value of carbon monoxide is reduced and an increase in the emission values of nitrogen oxide and/or hydrocarbon is permitted.

In one preferred embodiment of the invention, there is provision for the raw emission values at least of the first pollutant components to be adapted to the different conversion efficiency of a catalytic converter device which is arranged in an exhaust gas system of the internal combustion engine. As a result, the overall emission safety of the internal combustion engine can be improved. It is particularly preferred here to change the maximum or minimum threshold value and/or the maximum value of the second pollutant component as a function of the operating temperature of the catalytic converter device.

A further object of the invention is to improve a continuous regulation of the lambda value of the exhaust gas of an internal combustion engine.

With this objects of the invention in view there is also provided, a method for operating an internal combustion engine, the method including the steps of:

providing a lambda probe, in particular a broadband lambda probe, in an exhaust gas system of an internal combustion engine for continuously regulating a lambda value of an exhaust gas; and calibrating the lambda probe by using emission values of at least two pollutant components of the exhaust gas.

Thus, according to the invention, there is provided, a method for operating an internal combustion engine having at least one lambda probe, in particular a broadband lambda probe, which is arranged in an exhaust gas system of the internal combustion engine and has the purpose of continuously regulating the lambda value of the exhaust gas, wherein the emission values of at least two pollutant components of the exhaust gas, in particular nitrogen oxide, hydrocarbon and/or carbon monoxide are used to calibrate or standardize the lambda probe.

In other words, in order to operate an internal combustion engine with at least one catalytic converter device which is arranged in an exhaust gas system, wherein at least one lambda probe is arranged in the exhaust gas system in order to continuously regulate the lambda value of the exhaust gas, emission values of the exhaust gas preferably of nitrogen oxide, hydrocarbon and/or carbon monoxide, are used to calibrate the lambda probe. The invention is based on the recognition that the lambda value of the exhaust gas can be determined from the emission values of various pollutant components as the concentration of each pollutant component in the exhaust gas has a characteristic lambda dependence which can be stored, for example, in input-output maps or characteristic diagrams.

A preferred mode according to the invention includes using at least two compounds selected from the group consisting of nitrogen oxide, hydrocarbon and carbon monoxide as the at least two pollutant components.

Another preferred mode according to the invention includes providing a catalytic converter device in the exhaust gas system and preferably providing the lambda probe downstream of the catalytic converter device, and calibrating the lambda probe as a function of an operating state of the catalytic converter device.

Another preferred mode according to the invention includes calibrating the lambda probe only if the catalytic converter device has an operating temperature within a given window.

Another preferred mode according to the invention includes preregulating an air/fuel ratio designated as lambda by using a signal of the lambda probe such that a setpoint value of lambda is substantially equal to one; concluding that an actual value of lambda is greater than one when a nitrogen oxide breakthrough occurs and concluding that an actual value of lambda is less than one when a hydrocarbon breakthrough and/or a carbon monoxide breakthrough occurs; and shifting the air/fuel ratio lambda toward rich or lean until the nitrogen oxide breakthrough reaches a minimum and at the same time the hydrocarbon breakthrough and/or the carbon monoxide breakthrough reach a minimum.

In one preferred embodiment of the invention, the lambda probe is calibrated using the emission values of the exhaust gas only if, in the case of a lambda probe which is arranged downstream of a catalytic converter device, the catalytic converter device has an anticipated operating temperature preferably in a temperature range between 200 and 400 degrees Celsius.

In a further embodiment of the invention, the lambda value of the exhaust gas is regulated to a value of one, and an adaptation is carried out to this value using the emission values of hydrocarbon and/or carbon monoxide on the one hand, and nitrogen oxide on the other. Here, the fact is taken into account that when a $NO_x$ breakthrough occurs, an actual lambda value of greater than one can be concluded, and when a hydrocarbon breakthrough and/or carbon monoxide breakthrough occurs in the emission an actual lambda value of less than one can be concluded.

With the method according to the invention it is possible to easily correct errors in the signal of the broadband lambda probe which are due to ageing influences or contamination influences or to fabrication tolerances or the like. Likewise, it is possible to compensate for a shifting in the probe characteristic curve caused by specific components of the exhaust gas, for example the so-called shifting to rich-burn caused by a hydrogen content in the exhaust gas. A further advantage of the method according to the invention is that it is possible to dispense with the use of a two-point lambda probe for a precise measurement of the lambda value of the exhaust gas in the range of lambda equal to one.

In the method according to the invention, it is advantageously possible to use electrochemical and/or optical sensors such as are known, for example, from the aforementioned patent documents EP 0899563, WO 79/47962, EP 090941 or DE 19831424. Particularly preferred here are optical sensors, in particular infrared sensors, with a negligibly small T90 time (time period within which a measurement value reaches 90% of its final value), as they permit the emission values of the respective pollutant components to be determined virtually without delay for the practical requirements of the invention. It is particularly preferred also to use a sensor for separately measuring all the respective pollutant components, and a sensor for measuring pollutant components and the lambda value of the exhaust gas.

With the objects of the invention in view there is also provided, a method for operating an internal combustion engine, the method including the steps of:

determining emission values of at least two pollutant components of an exhaust gas of an internal combustion engine;

comparing the emission values of the at least two pollutant components with given setpoint values for providing a comparison result;

using the comparison result in order to form a state signal characteristic of an operating state of the internal combustion engine; and performing a diagnosis of the operating state of the internal combustion engine.

In other words, according to the invention, there is provided, a method for operating an internal combustion engine in which the pollutant emission of the internal combustion engine is used to diagnose the operating state of the internal combustion engine, wherein the emission values of at least two pollutant components of the exhaust gas are determined, compared with predefined setpoint values, and the comparison result is used to form a state signal which is characteristic of the operating state of the internal combustion engine.

A preferred mode according to the invention includes changing a value of at least one operating parameter as a function of the comparison result in order to change an emission value of a first one of the at least two pollutant components, and forming the state signal characteristic of the operating state of the internal combustion engine by using a required value of a change in the at least one operating parameter and/or a change in a second one of the at least two pollutant components.

Another preferred mode according to the invention includes performing the diagnosis by determining an ignition behavior as the operating state of the internal combustion engine.

Another preferred mode according to the invention includes performing the diagnosis by determining a misfiring such as a delayed combustion and/or a failed ignition.

Another preferred mode according to the invention includes determining at least one parameter such as a rotational speed of the internal combustion engine and/or a change in the rotational speed of the internal combustion engine, and using the at least one parameter for the diagnosis of the operating state of the internal combustion engine.

Another preferred mode according to the invention includes determining at least one characteristic such as a peak height and/or an envelope curve shape of the emission values of the at least two pollutant components, and evaluating the at least one characteristic for the diagnosis of the operating state of the internal combustion engine.

Another preferred mode according to the invention includes using raw emission values as the emission values.

Another preferred mode according to the invention includes providing the internal combustion engine with cylinder banks and associated exhaust gas manifolds, and performing the diagnosis separately for each of the cylinder banks or each of the associated exhaust gas manifolds.

Another preferred mode according to the invention includes displaying a value of the state signal and/or storing the value of the state signal as a function of the value of the state signal.

Another preferred mode according to the invention includes providing a catalytic converter device including a three-way catalytic converter, an oxidation catalytic converter, and/or a $NO_x$ storage catalytic converter.

Another preferred mode according to the invention includes providing a plurality of exhaust gas paths in an exhaust gas system of the internal combustion engine.

Another preferred mode according to the invention includes providing a plurality of exhaust gas paths in an exhaust gas system of the internal combustion engine, and separately determining emission values assigned to respective ones of the exhaust gas paths.

Another preferred mode according to the invention includes determining accumulated emission values of at least two pollutant components.

Another preferred mode according to the invention includes using at least one electrochemical sensor or at least one optical sensor in order to determine the emission values of the at least two pollutant components.

Another preferred mode according to the invention includes using at least one optical sensor operating according to a principle of reflection spectroscopy in order to determine the emission values of the at least two pollutant components.

Another preferred mode according to the invention includes using at least one optical sensor operating in an infrared light range in order to determine the emission values of the at least two pollutant components.

Another preferred mode according to the invention includes using at least one sensor having a measuring time of less than 500 microseconds and/or measuring intervals of less than 200 microseconds in order to determine the emission values of the at least two pollutant components.

Another preferred mode according to the invention includes using the at least one sensor to determine the emission values of the at least two pollutant components and a lambda value of the exhaust gas.

Other features which are considered as characteristic for the invention are set forth in the appended claims.

Although the invention is illustrated and described herein as embodied in a method for operating internal combustion engines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
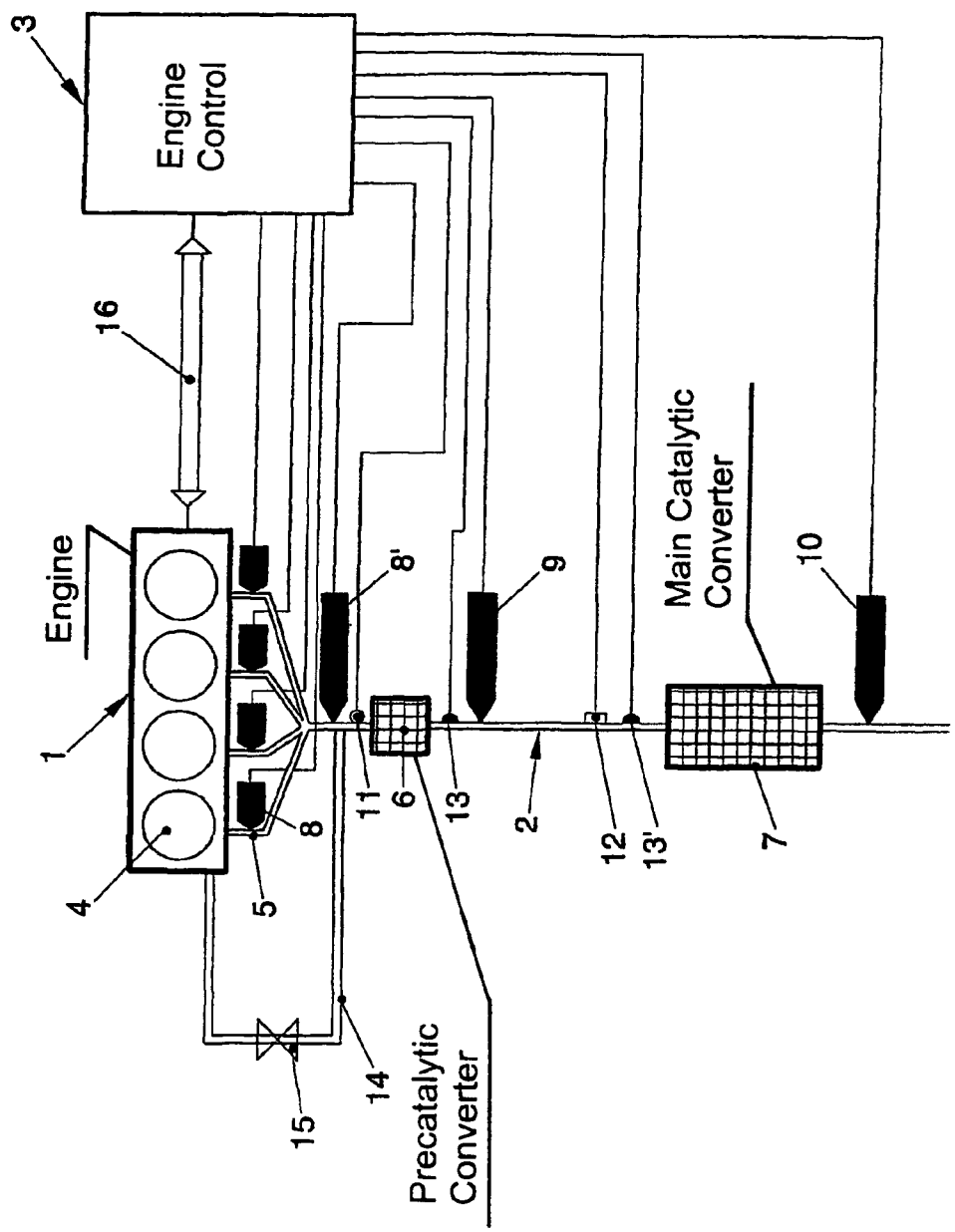
FIG. 1 is a diagrammatic view of an internal combustion engine with an assigned exhaust gas system according to the invention.

Referring now to the figures of the drawings in detail and first, particularly, to FIG. 1 thereof, there is shown, in a schematic illustration, an internal combustion engine 1, for example a spark ignition engine which is capable of lean running or a diesel internal combustion engine and has an exhaust gas system 2 and an engine control unit 3, preferably for operating a motor vehicle. The internal combustion engine 1 has a number of cylinder banks 4, wherein corresponding components are provided only with one reference symbol, each of the cylinder banks having its own exhaust gas path 5 connected downstream thereof. A precatalytic converter 6 and a main catalytic converter 7 are arranged in the exhaust gas system as catalytic converter devices. The precatalytic converter 6 is preferably embodied as a three-way catalytic converter, and the main catalytic converter 7 as a $NO_x$ storage catalytic converter. Sensors 8 with which the concentration of pollutant components of the exhaust gas—conducted through the exhaust gas system 2—of the internal combustion engine 1 can be measured are arranged in the exhaust gas paths 5 downstream of the cylinder banks 4. For example the components may be CO, NO, $NO_2$, $NH_3$, $SO_2$, $H_2S$, $CH_4$ as well as other hydrocarbon components. In addition, a further sensor 8' for measuring pollutant components of the exhaust gas is arranged downstream of the precatalytic converter 6. A further sensor 9 for determining the concentration of pollutants in the exhaust gas is arranged in a region of the exhaust gas system 2 between a precatalytic converter 6 and the main catalytic converter 7, downstream of the precatalytic converter 6 and upstream of the main catalytic converter 7. A further sensor 10 is arranged downstream of the main catalytic converter 7 in the exhaust gas system 2. The sensors 8, 8', 9 and 10 which are illustrated only schematically in FIG. 1 may be multi-component sensors which are each capable of sensing more than one pollutant component in the exhaust gas, or a plurality of sensors which are combined in the drawing for the sake of simplification and which each respectively measure various pollutant components separately.

Optical multi-component sensors are preferably used for the sensors 8, 8', 9 and/or 10 which can determine the absolute concentration of pollutant components in the exhaust gas through the use of a spectrographic method which is known per se. Such sensors operate extremely quickly, with measuring times less than 500 microseconds. The short measuring times permit measuring intervals of, for example 200 microseconds. In addition, such sensors have a sufficiently high physical and chemical stability, in particular as far as the parameters, temperature, soiling and chemical reactions in the exhaust gas are concerned. However, apart from optical sensors, electrochemical sensors, for example on a zircon dioxide basis with more than one oxygen pump, are also possible. The sensors used preferably permit not only the concentration of pollutant components but also the air/fuel ratio lambda to be measured.

In addition to the aforementioned sensors, lambda probes 11 and 12 are provided upstream of the precatalytic converter 6 and downstream of the precatalytic converter 6 and upstream of the main catalytic converter 7, and temperature sensors 13, 13' are provided for determining the operating temperature of the catalytic converter devices. For recirculating exhaust gas, the internal combustion engine 1 has an exhaust gas recirculation device 14 with a controllable valve 15.

The engine control unit 3 senses, in a manner known per se through the use of other sensors, operating parameters of the internal combustion engine 1 such as, for example a throttle valve setting, an exhaust gas feedback rate, an ignition time, an injection time of pre/main/post injections, an injection pressure, a tumble valve setting, a charge pressure, a phase actuator of the camshaft, a rotational speed, an accelerator pedal setting, a load, a vapor driving speed and the like and can, under certain circumstances, influence the latter through the use of actuating elements, a cable system 16 or the like being provided for communication between the engine control unit 3 and the sensors or actuating elements.

In particular, the engine control unit 3 includes a lambda regulating device for regulating the oxygen concentration in the exhaust gas and the lambda value. Through the use of the lambda value it is possible to influence the raw emission of pollutant components, in particular HC, CO and $NO_x$.

In addition, the overall emission of the pollutants depends crucially on the lambda value, in particular as the conversion functions of catalytic converter devices are dependent on the lambda value. A $NO_x$ storage catalytic converter 7 is usually operated in a storage cycle which includes at least one usually slow absorption mode and a faster regeneration mode. The absorptive storage is however carried out at a lambda value of greater than one, and the removal from storage at a later time at a lambda value of less of equal to one. Such storage catalytic converters are therefore predominantly used with engines which are capable of lean running. In contrast to such storage catalytic converters, three-way catalytic converters are operated as far as possible such that the lambda value is kept at a value of one. They are correspondingly predominantly used with conventional spark ignition engines or as precatalytic converters during a warming up phase before a $NO_x$ storage catalytic converter has reached the temperature which is necessary for the storage of $NO_x$ in spark ignition engines which are capable of lean running. As these internal combustion engines can always be operated with an excess air factor, that is to say a lambda value of greater than one, it is possible to use $NO_x$ storage catalytic converters to reduce the $NO_x$ emission but in order to discharge the storage and to convert $NO_x$ at a lambda value of less than one special measures are necessary such as an increased recirculation of exhaust gas or the injection of fuel into the exhaust gas system.

The method according to the invention can be used both in conventional spark ignition engines and spark ignition engines which are capable of lean running as well as in diesel internal combustion engines for optimizing the raw emission of pollutant components. For this purpose, a sensor 8, 8' which is arranged downstream of the catalytic converter device 6 is preferably used to determine the emission value of at least two pollutant components of the exhaust gas.

These are preferably CO, CH or $NO_x$ components. The engine control unit 3 includes a control device to which the signal of the sensors 8, 8' is fed. The control device which is possibly also embodied as a separate component is configured for comparing the emission values of a first pollutant component with a predefined maximum threshold value. The control device also is configured for forming, as a function of the comparison value, a signal which is fed to further components of the engine control unit 3. In addition, the emission value of a second pollutant component is determined and compared with an assigned maximum value. If the emission value of the first pollutant component exceeds the maximum threshold value, an operating parameter is changed by the engine control unit 3 in accordance with the assigned signal in order to decrease the emission value of this pollutant component. Here, the emission value of the second pollutant component is also monitored to determine whether it remains below the maximum value for this pollutant component. The first pollutant component which is to be decreased may be, for example $NO_x$, and the second pollutant component HC or CO. Likewise, the cumulated value of the two pollutant components HC and CO can also be used. Such a decrease in the $NO_x$ concentration at the cost of other components is particularly advantageous in a conventional spark ignition engine with $NO_x$ problems, for example for SULEV vehicles (Super Ultra Low Emission Vehicles).

According to a further embodiment of the method according to the invention, CO can be selected as a pollutant component to be decreased, and $NO_x$ and/or HC can be selected as a second pollutant component. This is preferred in particular in conventional spark ignition engines and spark ignition engines which are capable of lean running as well as in diesel internal combustion engines with CO problems.

In a further variant of the method according to the invention, the emission value of a pollutant component is determined and compared with a predefined minimum threshold value. As soon as the value drops below the minimum threshold value, the value of at least one operating parameter is changed in order to increase the emission value of this pollutant component to a maximum of this threshold value, at the same time a decrease in the emission value for a second pollutant component is brought about.

According to the invention, for example the exhaust gas recirculation rate is changed in order to change the emission values of the at least two pollutant components. An increase in the exhaust gas recirculation rate decreases the $NO_x$ raw emissions of an internal combustion engine in a manner known per se. On the other hand, excessively high exhaust gas recirculation rates give rise to increased HC emission values, and in addition to increased formation of soot in diesel internal combustion engines. Further preferred operating parameters are the ignition time as well as the injection time of pre-injections, main injections and/or post-injections, as well as the injection pressure of the fuel, in internal combustion engines with direct injection. Further operating parameters which influence the pollutant emission are, if appropriate, the setting of a tumble valve, the value of an actuator of camshafts and/or the charge pressure when a supercharging method is used.

In the regulating method described above, a method of controlling or regulating the lambda value of the exhaust gas which is known per se is preferably used, in particular employing input-output maps or characteristic diagrams which are stored in the engine regulating device 3. For example the position of a throttle valve or the sucked-in quantity of air can be used here as control variables.

Figure 2:
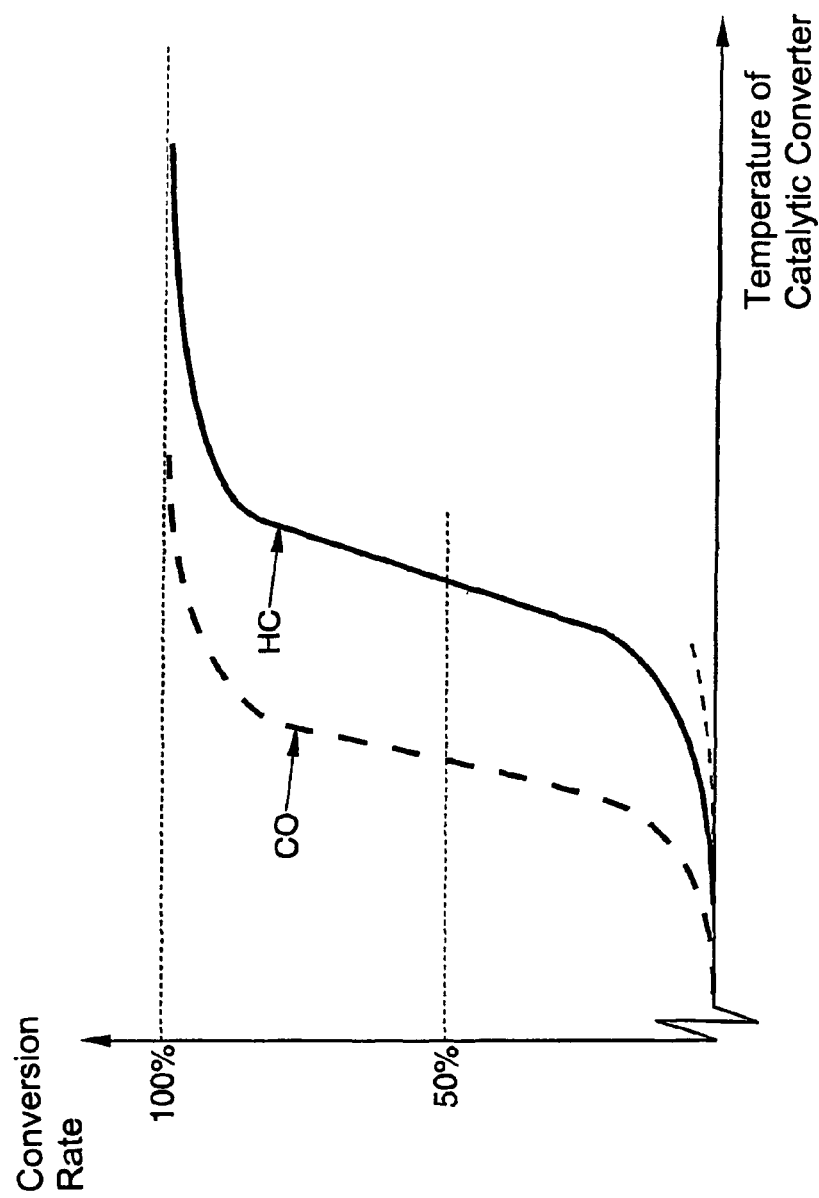
FIG. 2 is a graph illustrating the conversion rate of a three-way catalytic converter for carbon monoxide and hydrocarbons as a function of the temperature of the catalytic converter.

FIG. 2 shows a schematic view of the conversion rate of a three-way catalytic converter for CO and HC emissions as a function of the temperature of the catalytic converter. As is apparent, the conversion rate does not exceed a limit of 50% until the minimum temperature, the so-called "light-off temperature". As is apparent from FIG. 2, the light-off temperature of the catalytic converter is generally different for different pollutant components, resulting in a different temperature-dependent emission spectrum for the various pollutant components downstream of the catalytic converter. According to the invention the raw emission spectrum of an internal combustion engine is adapted to the different conversion performance of a downstream catalytic converter device at various temperatures. Both the pollutant emission values measured downstream of a catalytic converter device and modeled values which are stored in a data memory can be used for this. In the scenario illustrated in FIG. 2, the light-off temperature for the pollutant component CO is lower than the pollutant component HC. In this case, the CO concentration is therefore increased while simultaneously decreasing the HC concentration in exhaust gas as an effective way of reducing the overall emission of pollutants. Correspondingly, the maximum threshold value or the minimum threshold value is changed as a function of the operating temperature of the catalytic converter device.

Figure 3:
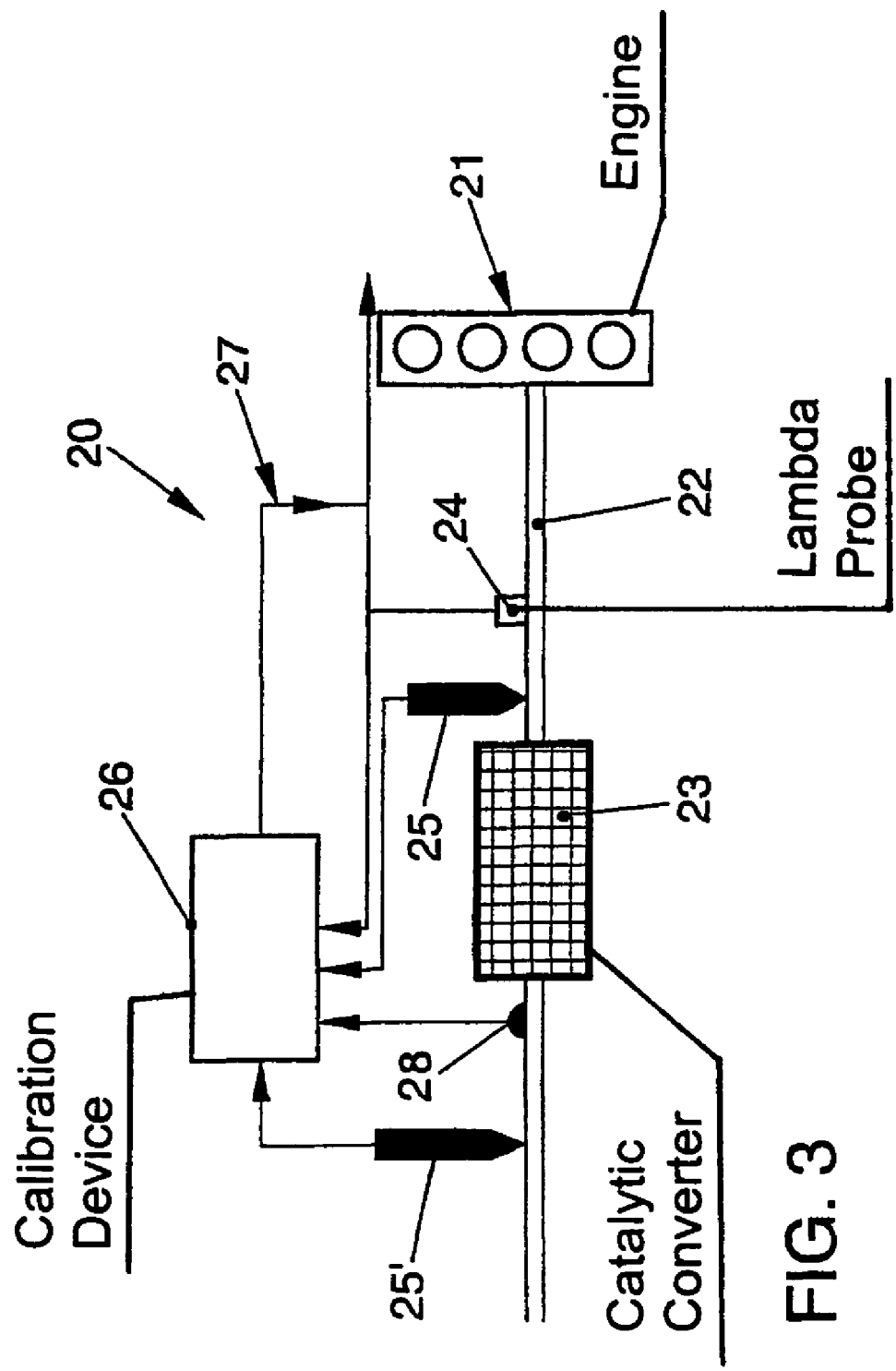
FIG. 3 is a block diagram for illustrating the signal paths for calibrating a lambda probe according to the invention.

In order to improve the continuous regulation of the lambda value of the exhaust gas, according to the invention emission values of the exhaust gas are used to calibrate a suitable lambda probe, for example a broadband lambda probe. Such probes are subject, for example, to ageing processes, contamination and manufacturing tolerances which act in a falsifying fashion on the probe signal. The method according to the invention is explained more precisely with reference to the regulating system 20 illustrated in FIG. 3. In FIG. 3, 21 designates an internal combustion engine with an exhaust gas system 22 and an assigned catalytic converter device 23. A broadband lambda probe 24 is arranged upstream of the catalytic converter device 23. In addition, multi-component sensors 25, 25' are arranged respectively upstream and downstream of the catalytic converter 23. The broadband lambda probe 24 can also be arranged downstream of the catalytic converter 23. The signals of the broadband lambda probe 24 are fed to a calibration device 26. In addition, the calibration device 26 receives signals from the multicomponent sensors 25 and/or 25' for evaluation. As the concentration of pollutant components in the exhaust gas has a characteristic lambda dependence which can be stored, for example, in characteristic diagrams, a correction value for calibrating the broadband lambda probe 24 can be determined. For this purpose, the emission values which are determined by the sensors 25, 25' are evaluated using corresponding lambda values supplied from the broadband lambda probe 24, and a correction signal 27 is determined from the evaluation result.

As the conversion behavior of the catalytic converter device 23 is generally temperature-dependent, it is expedient to evaluate the emission values of the multicomponent sensor 25' arranged downstream as a function of the temperature of the catalytic converter device 23. For this purpose, a temperature sensor 28, which may be arranged as close as possible to the catalytic converter 23, or a temperature modeling is provided, the signals of which are fed to the calibration device 26. In particular it is possible to provide that emission values which are determined downstream of the catalytic converter device 23 are evaluated by the calibration device 26 only if the catalytic converter device 23 has a temperature within a preferred temperature window, in particular above a light-off temperature. The temperature window preferably lies in a temperature range between 200 and 400 degrees Celsius.

The calibration of the broadband lambda probe 24 in the region of a lambda value of equal to one is preferred. In the region around lambda=1, for example in a three-way catalytic converter, the conversion behavior of the catalytic converter device 23 is known at least above the light-off temperature and can be stored, for example, as a characteristic diagram in the calibration device 26. The emission values which are measured through the use of the sensor 25' downstream of the catalytic converter 23 may have, for example, increased $NO_x$ values which indicate a lambda value of greater than one, or it is possible to measure increased HC/CO or $NH_3$ values which indicate a lambda value of less than one.

As the emission values of the exhaust gas of an internal combustion engine are in particular also dependent on the details of the combustion process, according to the invention the emission values of at least two pollutant components of the exhaust gas are used to diagnose the operating state of the internal combustion engine. The emission values of at least two pollutant components are determined here and compared with setpoint values which are stored, for example, in a memory of the engine control device 3. The comparison result is used to form a state signal which is characteristic of the operating state of the internal combustion engine, and a lambda value of the exhaust gas is changed as a function of the value of the state signal. Here, the diagnosis preferably relates to the ignition behavior of the internal combustion engine, in particular in order to identify delayed combustions and/or misfires.

Figure 4:
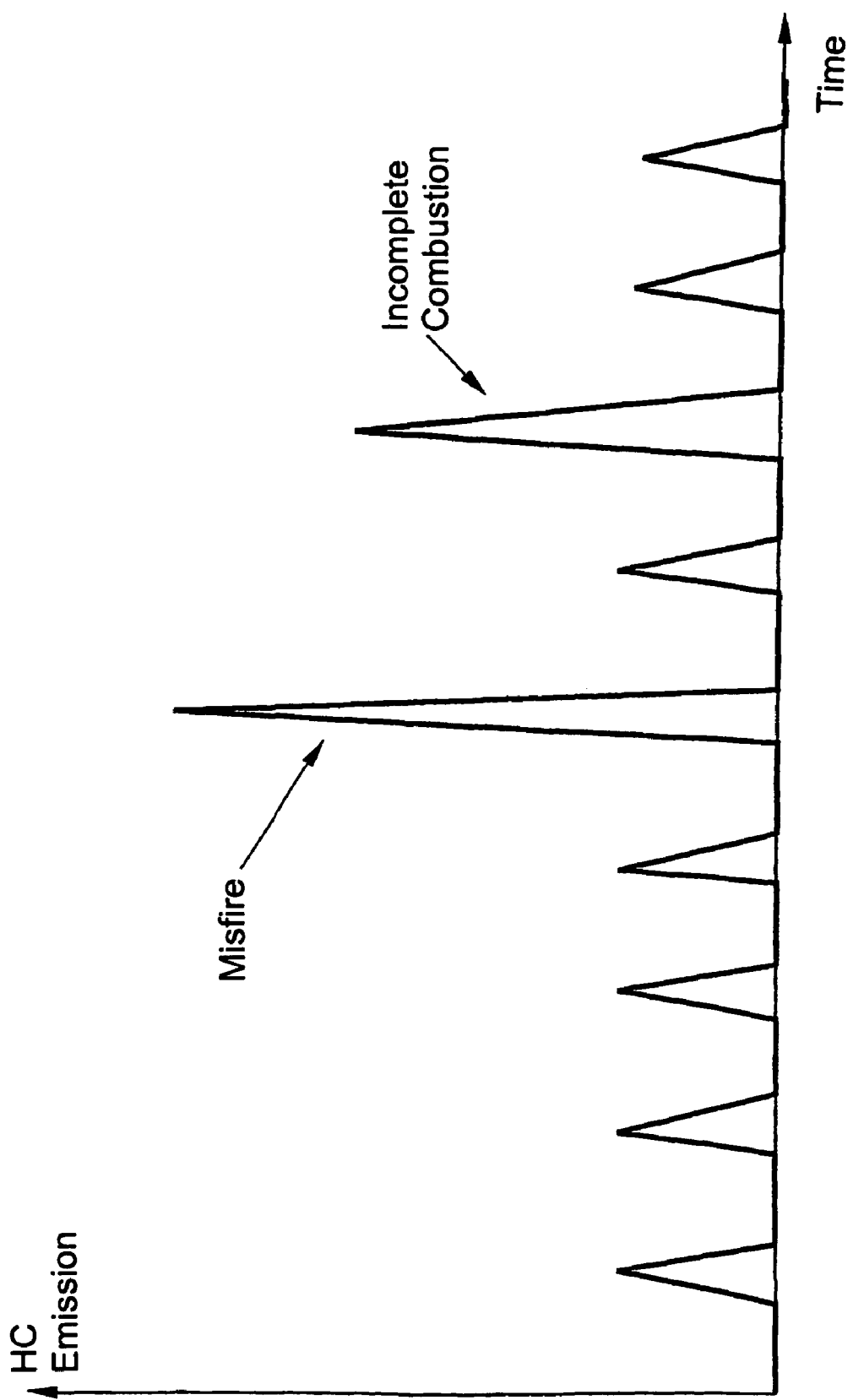
FIG. 4 is a graph illustrating hydrocarbon emissions in the internal combustion engine with combustion faults.

As is illustrated schematically in FIG. 4, ignition misfires (failed ignitions) or delayed combustions are manifest for example in increased HC emission values of the internal combustion engine. Here, an ignition misfire has a characteristic peak level and an envelope curve of emission values, which are plotted over time, that are respectively different from that of a delayed or incomplete combustion. Whereas in the case of such an ignition behavior of the internal combustion engine the HC emission values rise, the $NO_x$ or CO emission values may behave differently, in particular lower $NO_x$ or CO values may occur for a short time in particular when ignition has not taken place or there is delayed combustion.

In accordance with a further aspect of the invention, operating parameters, for example the exhaust gas recirculation rate, are changed as a function of the comparison value in order to decrease or increase the emission value of specific pollutant components. Here, according to the invention, the necessary value of the change in this operating parameter is evaluated and used to form the state signal which characterizes the operating state of the internal combustion engine. Alternatively, or in addition, the change in the emission value of a further pollutant component is sensed as a function of the operating parameter and taken into account in the formation of the state signal. Combustion problems, in particular misfires and/or delayed or incomplete combustions of the fuel preferably occur in the lean phase in internal combustion engines which are capable of lean running. In this case, according to the invention, the lambda value is reduced in the direction of a richer mixture.

As the combustion behavior of the internal combustion engine affects the rotational speed of the internal combustion engine, according to a further aspect of the invention the rotational speed of the internal combustion engine can additionally be determined and evaluated, in particular the fluctuations in the rotational speed of the internal combustion engine within a predefined time interval are determined and taken into account in the diagnosis. A diagnosis which is selected for individual cylinders or at least cylinder banks can take place if the raw emission values in the separate exhaust gas manifolds which are respectively assigned to a cylinder bank are determined by separate sensors 8, as illustrated in FIG. 1.

The state signal can be presented through the use of a display in order to permit manual intervention of a vehicle driver. There is also optionally provision for the value of the state signal to be stored so that, if appropriate in the case of servicing work or repair measures, the value of the state signal can be evaluated.

In the method according to the invention, sensors for the pollutant components CO, NO, $NO_2$, $NH_3$, $SO_2$, $H_2S$, $CH_4$ and further HC components which can be detected separately from one another at the same time are preferably used. The measurement can be continuous or discontinuous here.

The specific method of functioning of the sensors is insignificant for the invention described above. However, optical, in particular infrared sensors, are preferably used. These permit very short measurement times, for example of less than 500 microseconds, and measurement intervals of, for example less than 200 microseconds and correspondingly fast and precise evaluation of the respective emission values.

In summary, the method according to the invention provides a possibility of considerably improving the emission behavior of an internal combustion engine with low additional expenditure. It is particularly advantageous that the method can be used with a wide variety of types of internal combustion engines, conventional spark ignition engines or spark ignition engines capable of lean running, diesel internal combustion engines or the like, in combination with various catalytic converter devices and strategies for reducing exhaust gas emission values.

I claim:

1. A method for operating an internal combustion engine, the method which comprises:

measuring emission values of at least two pollutant components of an exhaust gas of an internal combustion engine, the at least two pollutant components including a first pollutant component and a second pollutant component;

changing a value of at least one operating parameter of the internal combustion engine in order to decrease an emission value of the first pollutant component if the emission value of the first pollutant component exceeds a given maximum threshold value;

monitoring an emission value of the second pollutant component in order to determine whether the emission value of the second pollutant component remains below a maximum value for the second pollutant component and whether an increase in the emission value to the maximum value for the second pollutant component is permitted; and determining accumulated emission values of at least two pollutant components.

2. The method according to claim 1, which comprises using, as the internal combustion engine, an engine selected from the group consisting of a diesel internal combustion engine and a spark ignition engine configured for a lean running operation.

3. The method according to claim 1, which comprises:
monitoring, as the first pollutant component, a component selected from the group consisting of CO, NO, $NO_2$, $NH_3$, $SO_2$, $H_2S$, $CH_4$ and a hydrocarbon component; and
monitoring, as the second pollutant component, a further component selected from the group consisting of CO, NO, $NO_2$, $NH_3$, $SO_2$, $H_2S$, $CH_4$ and a hydrocarbon component.

4. The method according to claim 1, which comprises using, as the at least one operating parameter of the internal combustion engine, at least one parameter selected from the group consisting of a throttle valve position, an exhaust gas recirculation rate, an ignition time, a tumble valve-position, an injection time, a charge pressure and a phase position of a camshaft.

5. The method according to claim 1, which comprises measuring, as the emission values, values of a raw emission.

6. The method according to claim 1, which comprises:
using hydrocarbon as the first pollutant component; and
using at least one component selected from the group consisting of nitrogen oxide and carbon monoxide as the second pollutant component.

7. The method according to claim 1, which comprises:
using nitrogen oxide as the first pollutant component; and
using at least one component selected from the group consisting of carbon monoxide and hydrocarbon as the second pollutant component.

8. The method according to claim 1, which comprises:
using carbon monoxide as the first pollutant component; and
using at least one component selected from the group consisting of nitrogen oxide and hydrocarbon as the second pollutant component.

9. The method according to claim 1, which comprises choosing at least one pollutant value as a function of an operating point of the internal combustion engine, wherein the at least one pollutant value is selected from the group consisting of the given maximum threshold value of the first pollutant component, a minimum threshold value of the first pollutant component and the maximum value of the second pollutant component.

10. The method according to claim 1, which comprises:
choosing at least one pollutant value as a function of an operating point selected from the group consisting of a load of the internal combustion engine, a rotational speed of the internal combustion engine and an operating temperature of the internal combustion engine; and
using, as the at least one pollutant value, a value selected from the group consisting of the given maximum threshold value of the first pollutant component, a minimum threshold value of the first pollutant component and the maximum value of the second pollutant component.

11. The method according to claim 1, which comprises:
providing a catalytic converter device in an exhaust gas system of the internal combustion engine; and
choosing at least one threshold value selected from the group consisting of the maximum threshold value of the first pollutant component and a minimum threshold value of the first pollutant component as a function of an operating point of one of the catalytic converter device and the internal combustion engine.

12. The method according to claim 1, which comprises:
providing a catalytic converter device in an exhaust gas system of the internal combustion engine; and
choosing at least one threshold value selected from the group consisting of the maximum threshold value of the first pollutant component and a minimum threshold value of the first pollutant component as a function of an operating temperature of the catalytic converter device.

13. The method according to claim 1, which comprises providing a catalytic converter device including a catalytic converter selected from the group consisting of a three-way catalytic converter, an oxidation catalytic converter, and a $NO_x$ storage catalytic converter.

14. The method according to claim 1, which comprises providing a plurality of exhaust gas paths in an exhaust gas system of the internal combustion engine.

15. The method according to claim 1, which comprises:
providing a plurality of exhaust gas paths in an exhaust gas system of the internal combustion engine; and
separately determining emission values assigned to respective ones of the exhaust gas paths.

16. The method according to claim 1, which comprises using at least one electrochemical sensor in order to determine the emission values of the at least two pollutant components.

17. The method according to claim 1, which comprises using at least one optical sensor in order to determine the emission values of the at least two pollutant components.

18. The method according to claim 1, which comprises using at least one optical sensor operating according to a principle of reflection spectroscopy in order to determine the emission values of the at least two pollutant components.

19. The method according to claim 1, which comprises using at least one optical sensor operating in an infrared light range in order to determine the emission values of the at least two pollutant components.

20. The method according to claim 1, which comprises using at least one sensor having at least one property selected from the group consisting of a measuring time of less than 500 microseconds and measuring intervals of less than 200 microseconds in order to determine the emission values of the at least two pollutant components.

21. The method according to claim 1, which comprises using at least one sensor to determine both, the emission values of the at least two pollutant components and a lambda value of the exhaust gas.

22. A method for operating an internal combustion engine, the method which comprises:
determining emission values of at least two pollutant components of an exhaust gas of an internal combustion engine, the at least two pollutant components including a first pollutant component and a second pollutant component;
changing a value of at least one operating parameter of the internal combustion engine if an emission value of the first pollutant component drops below a given minimum threshold value in order to increase the emission value of the first pollutant component to at most the given minimum threshold value in order to decrease at least an emission value of the second pollutant component; and
determining accumulated emission values of at least two pollutant components.

23. The method according to claim 22, which comprises determining, as the emission values, values of a raw emission.

24. The method according to claim 22, which comprises:
using hydrocarbon as the first pollutant component; and using at least one component selected from the group consisting of nitrogen oxide and carbon monoxide as the second pollutant component.

25. The method according to claim 22, which comprises:
using nitrogen oxide as the first pollutant component; and
using at least one component selected from the group consisting of carbon monoxide and hydrocarbon as the second pollutant component.

26. The method according to claim 22, which comprises using carbon monoxide as the first pollutant component; and
using at least one component selected from the group consisting of nitrogen oxide and hydrocarbon as the second pollutant component.

27. The method according to claim 22, which comprises choosing at least one pollutant value as a function of an operating point of the internal combustion engine, wherein the at least one pollutant value is selected from the group consisting of a given maximum threshold value of the first pollutant component, the minimum threshold value of the first pollutant component and a maximum value of the second pollutant component.

28. The method according to claim 22, which comprises:
choosing at least one pollutant value as a function of an operating point selected from the group consisting of a load of the internal combustion engine, a rotational speed of the internal combustion engine and an operating temperature of the internal combustion engine; and
using, as the at least one pollutant value, a value selected from the group consisting of a given maximum threshold value of the first pollutant component, the minimum threshold value of the first pollutant component and a maximum value of the second pollutant component.

29. The method according to claim 22, which comprises:
providing a catalytic converter device in an exhaust gas system of the internal combustion engine; and
choosing at least one threshold value selected from the group consisting of a maximum threshold value of the first pollutant component and the minimum threshold value of the first pollutant component as a function of an operating point of one of the catalytic converter device and the internal combustion engine.

30. The method according to claim 22, which comprises:
providing a catalytic converter device in an exhaust gas system of the internal combustion engine; and
choosing at least one threshold value selected from the group consisting of a maximum threshold value of the first pollutant component and the minimum threshold value of the first pollutant component as a function of an operating temperature of the catalytic converter device.

31. The method according to claim 22, which comprises providing a catalytic converter device including a catalytic converter selected from the group consisting of a three-way catalytic converter, an oxidation catalytic converter, and a $NO_x$ storage catalytic converter.

32. The method according to claim 22, which comprises providing a plurality of exhaust gas paths in an exhaust gas system of the internal combustion engine.

33. The method according to claim 22, which comprises:
providing a plurality of exhaust gas paths in an exhaust gas system of the internal combustion engine; and
separately determining emission values assigned to respective ones of the exhaust gas paths.

34. The method according to claim 22, which comprises using at least one electrochemical sensor in order to determine the emission values of the at least two pollutant components.

35. The method according to claim 22, which comprises using at least one optical sensor in order to determine the emission values of the at least two pollutant components.

36. The method according to claim 22, which comprises using at least one optical sensor operating according to a principle of reflection spectroscopy in order to determine the emission values of the at least two pollutant components.

37. The method according to claim 22, which comprises using at least one optical sensor operating in an infrared light range in order to determine the emission values of the at least two pollutant components.

38. The method according to claim 22, which comprises using at least one sensor having at least one property selected from the group consisting of a measuring time of less than 500 microseconds and measuring intervals of less than 200 microseconds in order to determine the emission values of the at least two pollutant components.

39. The method according to claim 22, which comprises using at least one sensor to determine both, the emission values of the at least two pollutant components and a lambda value of the exhaust gas.

* * * * *